United States Patent [19]

Andrews

[11] Patent Number: 4,522,990

[45] Date of Patent: Jun. 11, 1985

[54] LIGHT STABLE POLYMERS BY ANIONIC POLYMERIZATION

[75] Inventor: Gerald D. Andrews, Hockessin, Del.

[73] Assignee: E. I. Du Pont de Nemours and Company, Wilmington, Del.

[21] Appl. No.: 564,011

[22] Filed: Dec. 16, 1983

Related U.S. Application Data

[62] Division of Ser. No. 369,937, Apr. 19, 1982, abandoned.

[51] Int. Cl.$^3$ ............................ C08F 4/48; C08F 4/46
[52] U.S. Cl. .................................. 526/180; 526/329.7
[58] Field of Search ......................................... 526/180

[56] References Cited

U.S. PATENT DOCUMENTS

| | | | |
|---|---|---|---|
| 3,956,269 | 5/1976 | Sheppard et al. | 260/192 |
| 4,210,612 | 7/1980 | Karrer | 525/204 |
| 4,294,949 | 10/1981 | Karrer | 526/262 |
| 4,308,362 | 12/1981 | Wiezer et al. | 525/328 |

FOREIGN PATENT DOCUMENTS

| | | | |
|---|---|---|---|
| 10084 | 8/1962 | Japan | 526/180 |
| 15787 | 7/1969 | Japan | 526/180 |
| 3988 | 1/1971 | Japan | 526/180 |
| 89 | 1/1979 | Japan | 526/180 |

OTHER PUBLICATIONS

Uhran et al., German Offen. 2,642,374; Chemical Abstracts, vol. 89, 1978, 25318k.
Uhran et al., German Offen. 2,642,386; Chemical Abstracts, vol. 89, 1978, 25804r.
Short, German Offen, 2,820,419; Chemical Abstracts, vol. 90, 1979, 88907t.
Viezer et al., German Offen, 2,748,362; Chemical Abstracts, vol. 91, 1979, 58147y.
Karrer, Makromol. Chem. 181, 595–633, (1980).

*Primary Examiner*—Christopher A. Henderson

[57] ABSTRACT

Anionic polymerization initiator which is a 2,2,6,6-tetramethylpiperidinyl alkali metal or an alkali metal 2,6-dimethyl-2,6-dialkyl-4-piperidinoxide.

4 Claims, No Drawings

LIGHT STABLE POLYMERS BY ANIONIC POLYMERIZATION

CROSS-REFERENCE TO RELATED APPLICATION

This is a division of application Ser. No. 369,937 filed Apr. 19, 1982 and now abandoned.

TECHNICAL FIELD

This invention relates to anionic polymerization initiators which impart light-stabilizing properties to polymers prepared therewith, and to polymers which impart light-stabilizing properties to polymers admixed therewith.

BACKGROUND

It is well known in the art that light, particularly ultraviolet light, stability can be imparted to polymers by incorporating therein certain chemical structural entities. Such entities can be admixed with preformed polymer or they can be incorporated into the polymer during the monomer polymerization step, for example, as a moiety of the monomer or as a moiety of the polymerization initiator.

Urethane polymers have been light-stabilized by incorporating into the prepolymer solution 4-amino- or 4-(3-aminopropyl)amino-2,2,6,6-tetramethylpiperidine, as disclosed in German Offenlegungsschrift Nos. 2,642,374 and 2,642,386, or bis(2,2,6,6-tetramethyl-4-piperidinyl)sebacate, as disclosed in German Offenlegungsschrift No. 2,820,419.

The effectiveness of 2,2,6,6-tetraalkylpiperidines as ultraviolet light stabilizers also is evident in the art as disclosed in German Offenlegungsschrift No. 2,748,362 and by F. E. Karrer, Makromol. Chem. 181, 595–633 (1980), wherein such disclosures the stabilizer is incorporated into a free radical polymerizable monomer. The stabilizer-containing monomer, for example, 2,2,6,6-tetramethyl-4-piperidyl acrylate can be homopolymerized or copolymerized with appropriate free radical copolymerizable monomers to provide polymers having improved light stability. Similar disclosures of acrylate and methacrylate monomers which contain heterocyclic groups and which are polymerizable to polymers exhibiting light stability are made in U.S. Pat. Nos. 4,210,612 and 4,294,949.

U.S. Pat. No. 4,308,362 discloses copolymers having repeat units of maleic or fumaric acid ester or amide, the ester or amide groups of which include alkylpiperidine moieties. The alkylpiperidine moieties impart light stability to the polymers. The light stabilizing portion of the polymer is characterized by low volatility, good migration stability and good compatibility with the substrate polymer to which the light stability characteristic is to be imparted. Azo and peroxy free radical initiators containing ultraviolet light stabilizing groups and their use in preparing free radical initiated polymers which exhibit ultraviolet light stability are disclosed in U.S. Pat. No. 3,956,269. Numerous types of ultraviolet light stabilizing compounds, incorporated into the free radical initiator, are disclosed, for example, phenyl salicylates, o-hydroxybenzophenones, cyanoacrylates and benzotriazoles.

It is an object of this invention to provide anionic polymerization initiators. Another object is to provide such initiators which have light stabilizing characteristics. Still another object is to provide processes for anionically polymerizing monomers by means of such initiators. A further object is to provide anionically polymerized polymers which exhibit stability towards light. A further object is to provide such light stable polymers which can impart light stability to other polymers admixed therewith. Further objects will become apparent hereinafter.

DISCLOSURE OF INVENTION

For further comprehension of the invention, and of the objects and advantages thereof, reference may be made to the following description and to the appended claims in which the various novel features of the invention are more particularly set forth.

The invention resides in anionic polymerization initiators which include a hindered amine moiety, in processes for anionically polymerizing monomers with such initiators, and in polymers which have been prepared by means of such initiators and which exhibit light stability, particularly toward ultraviolet (UV) light.

As is evident from the above, the light stabilizing characteristics of hindered amines, for example, 2,2,6,6-tetraalkylpiperidines, are known in the art. Admixing such compounds with polymers has been carried out to provide polymers which have improved stability towards light. Such tetraalkylpiperidine moieties also have been incorporated into monomers which thereupon provide the light stabilizing effect in polymers produced therefrom. The invention herein resides in anionic polymerizating initiators which include hindered amine moieties, particularly the 2,2,6,6-tetraalkylpiperidine and -piperidinol moieties. Whereas the art discloses free radical initiators which include various light stabilizing moieties, this invention provides anionic polymerization initiators and, moreover, it provides such initiators having tetraalkylpiperidine and tetraalkylpiperidinol moieties.

More particularly, the invention resides in the anionic polymerization initiator which is a 2,2,6,6-tetramethylpiperidino alkali metal or an alkali metal 2,6-dimethyl-2,6-dialkyl-4-piperidinoxide of the respective formulas

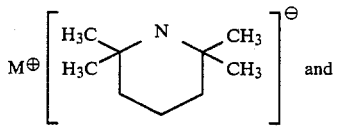 and

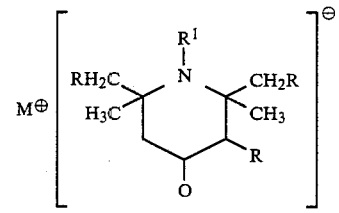

wherein R is H or $C_{1-4}$ alkyl, preferably H, R' is H, $C_{1-18}$ alkyl or $C_{7-12}$ aralkyl, preferably H, and M is alkali metal.

The initiators of this invention can be prepared by well known technical procedures for preparing alkali metal derivatives of amines and alcohols, for example, by reacting 2,2,6,6-tetramethylpiperidine or the appropriate piperidinol with an alkali metal source, such as n-butyllithium. The 2,2,6,6-tetramethylpiperidine and -4-piperidinol are readily available commercially. Other piperidinols which are useful herein include those disclosed by Karrer, supra., and in the aforesaid U.S. Pat. Nos. 4,210,612 and 4,294,949.

The initiators of this invention are suitable for polymerizing anionically polymerizable monomers by means of polymerizing conditions commonly used in the art for such monomers. Thus, one skilled in the art will readily know the polymerization conditions using the initiators of this invention. Preferred monomers include alkyl methacrylates, fluoroalkyl methacrylates, alkoxyalkyl methacrylates, dialkylaminoalkyl methacrylates and alkadienyl methacrylates. Further disclosure regarding the aforesaid monomers may be found in U.S. Pat. No. 4,293,674. Particularly preferred monomers for use in preparing either a homopolymer or a copolymer by means of the initiator of this invention include methyl methacrylate and butyl methacrylate.

The following description is intended to be a general description of polymerization conditions commonly used in the art. The initiator, in a solvent, is contacted with the monomer or monomers. Initiators heretofore commonly used include a carbanion salt, such as butyllithium, 1,1-diphenylhexyllithium or methyl α-lithio isobutyrate, or an alkoxide salt, such as potassium t-butoxide or potassium n-butoxide. The solvent can be a hydrocarbon, such as benzene, toluene or xylene, or an ether, such as diethyl ether, dioxane, ethylene glycol dimethyl ether, tetrahydrofuran or methyl t-butyl ether. The temperature of polymerization is important. As is known with conventional initiators not all combinations of solvents and initiators are useful at all temperatures. Moreover, the nature of the counterion may have to be considered. The following table shows variations in polymerization conditions using conventional initiators for methacrylate polymerization.

TABLE 1

| Initiator type | Counterion | Solvent type | Temperature (°C.) |
| --- | --- | --- | --- |
| carbanion | lithium | ether | −78 |
| carbanion | potassium | ether | 25 |
| alkoxide | potassium | ether | 25 |
| alkoxide | potassium | hydrocarbon | 0 |

Well known polymerization conditions include means for controlling the molecular weight of the polymer produced, for example, by varying the concentration of the initiator. The same means can be employed with the initiator of this invention. Under ideal conditions, as is known, the degree of polymerization (DP) is equal to the concentration of monomer or monomers divided by the concentration of initiator. However, as is also known, ideal conditions are seldom, if ever, achieved.

Polymers prepared with the initiator of this invention exhibit superior light stability as compared to polymers prepared from the same monomer or monomers but using a conventional anionic polymerization initiator. The polymer chains produced by means of the initiator of the invention have a piperidinyl or piperidinoxy end group which is provided by the initiator. Thus, the polymers of this invention differ structurally from art polymers relying on the tetraalkylpiperidine or tetraalkylpiperidinol moieties to impart light stability in that such moieties in the art polymers are provided by the monomer being polymerized or they are provided by a post treatment of preformed polymer.

If the polymers prepared herein are to be used directly, for example, as coatings having good light stability, they usually are prepared so as to be in the number average molecular weight range 3,000 to 15,000. If the polymers prepared herein are to be used as additives to impart light stability to other polymers, they usually are prepared so as to be in the number average molecular weight range 500 to 5,000.

Following are examples demonstrating the preparation of the anionic polymerization initiator of this invention, the use thereof in the preparation of polymers having improved stability toward light, and the use thereof to impart light stability to other polymers. All temperatures are in degrees Celsius. Although the only alkali metal (M) exemplified is lithium, any alkali metal is operable.

EXAMPLE 1

An oven-dried, 3-neck, 250-mL flask equipped with mechanical stirrer, rubber septum inlet, thermometer, and an argon atmosphere was charged with tetrahydrofuran (THF) (100 mL, freshly distilled from lithium aluminum hydride) and 2,2,6,6-tetramethylpiperidine (1.69 mL, 0.01 mol, distilled from NaOH and stored over molecular sieves under argon). n-Butyllithium (6.25 mL of a 1.6 M solution in hexane, 0.01 mol) was added to the solution at 23°–27°; the resulting solution was stirred 15 min and then cooled to below −70° in a dry ice-acetone bath. To this solution containing 2,2,6,6-tetramethylpiperidinyllithium was added dropwise methyl methacrylate (10.7 mL, 0.1 mol, filtered through 10 wt. % neutral alumina) over 15 min at −78° to −70°. The solution was warmed and poured into water (1.5 L); the precipitated polymer was isolated and dried, and then taken up and precipitated into hexane (1.5 L) from an acetone (75 mL) solution. After drying, 10.1 g (88% yield) of tetramethylpiperidine-ended polymethyl methacrylate (PMMA) was recovered; GPC analysis showed: $\overline{M}_n$ 1400, $\overline{M}_w$ 1700 (mol wt 1140 by design).

EXAMPLE 2

The initiator was prepared by the procedure of Example 1 except that the amounts of 2,2,6,6-tetramethylpiperidine, n-butyllithium solution and THF were, respectively, 0.76 mL (0.0045 mol), 3.0 mL (0.0045 mol) and 300 mL. To the initiator solution over about 30 min was added at −70° a mixture of 2,4-hexadienyl methacrylate (12.5 g, 0.075 mol), butyl methacrylate (45.5 g, 0.32 mol) and methyl methacrylate (10.5 g, 0.105 mol). The tetramethylpiperidine-ended poly(2,4-hexadienyl methacrylate/butyl methacrylate/methyl methacrylate) was isolated by neutralization with acetic acid, filtration, and concentration on a rotary evaporator. GPC analysis showed: $\overline{M}_n$ 68,000, $\overline{M}_w$ 219,000.

EXAMPLE 3

An oven-dried, 250-mL, 3-neck flask with mechanical stirrer, thermometer, rubber serum cap, and argon atmosphere was charged with THF (100 mL, freshly distilled from benzophenone/sodium) and 2,2,6,6-tetramethyl-4-piperidinol (0.63 g, 4 mmol). Potassium hydride (0.70 g of 23 wt % dispersion in mineral oil, 4 mmol) was added dropwise. After stirring 15 min at room temperature (gas evolution) a nearly clear solution had formed. To this initiator solution containing potassium 2,2,6,6-tetramethyl-4-piperidinoxide was added methyl methacrylate (21.2 mL, 0.2 mol) via syringe over 8 min. After 2 more minutes the solution was heated to 35°, at which point the temperature rose to 61° in 30 seconds. After 1 h the mixture was poured into rapidly stirred hexane (2 L). The solid was air-dried 2 h, dissolved in acetone (100 mL), filtered through Celite ® and precipitated in water (3 L). The precipitated polymer was isolated and dried overnight in vacuo; the 2,2,6,6-tetramethylpiperidinoxy-ended PMMA was recovered as a fine white powder (20.3 g); GPC analysis showed $\overline{M}_n$ 3900, $\overline{M}_w$ 14,000.

EXAMPLE 4

The initiator preparation of Example 3 was repeated with THF (100 mL), 2,2,6,6-tetramethyl-4-piperidinol (2.0 g, 0.0127 mol) and potassium hydride (2.23 g of 23% dispersion in mineral oil, 0.0127 mol, washed free of mineral oil with 2×20 mL THF). After addition of methyl methacrylate (18 g, 0.18 mol) as in Example 3, the solution was heated to 50°, whereupon its temperature rapidly rose to 65°. After stirring overnight the polymer was precipitated by pouring into ice-water (2 L), isolated by filtration, and dried overnight in vacuo, to give 2,2,6,6-tetramethylpiperidinoxy-ended PMMA as an off-white powder (24.8 g); the polymer contained about 10 wt % 2,2,6,6-tetramethylpiperidinoxy moieties; GPC analysis showed: $\overline{M}_n$ 300, $\overline{M}_w$ 1700.

EXAMPLE 5

The procedure of Example 4 was carried out except that the amounts used were as follows: THF (200 mL), 2,2,6,6-tetramethyl-4-piperidinol (4.0 g, 0.0254 mol) and methyl methacrylate (18 g, 0.18 mol). The 2,2,6,6-tetramethylpiperidinoxy-ended PMMA was recovered as an off-white powder (19.2 g); the polymer contained about 20 wt % 2,2,6,6-tetramethylpiperidinoxy moieties; GPC analysis showed: $\overline{M}_n$ 200, $\overline{M}_w$ 600.

EXAMPLE 6

A white unreduced paint was made by mixing the following:

(a) 78.74 g of a 76.2 wt % solution in methyl amyl ketone of a 14.8/40/30/0.2 (by weight styrene/-methyl methacrylate/hydroxyethyl acrylate/acrylic acid copolymer of molecular weight 6000 (vehicle solution);

(b) 89.67 g of a white millbase having a pigment-/binder ratio of 300/100 and containing 79.34% solids;

(c) 12.65 g of Resimene ® X-755 alkoxymethylmelamine resin; and (d) 19.24 g of an Aerosil ® millbase containing fumed alumina/silica, having a pigment/binder ratio of 14/100, and containing 63.3% solids.

Similarly, a blue unreduced paint was prepared from the same vehicle (55.67 g), Resimene ® X-755 (29.32 g), blue metallic millbase (49% solids, pigment/binder=29/100, 45.37 g) and the same Aerosil ® millbase (19.24 g). The final white and blue paint formulations were made by mixing with 200 g of each of the unreduced paints Tinuvin ® 328 stabilizer, the polymer product of either Example 4 or Example 5, p-toluenesulfonic acid catalyst, CS 1135 catalyst blocking agent, and solvent, in the amounts shown, in grams, in Table 2.

Tinuvin ® 328 is a UV screen of the formula

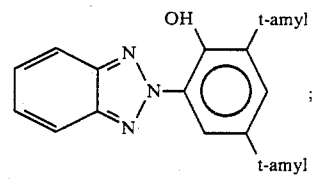

the catalyst is a 50:50, by weight, mixture of p-toluenesulfonic acid and methanol; CS 1135 is a catalyst blocking agent of the formula

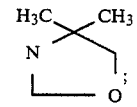

the solvent is a 70:30, by weight, mixture of methyl ethyl ketone and butyl cellosolve acetate.

The final paint formulations were sprayed onto unprimed, phosphate-treated steel panels. These panels were subjected to accelerated weathering tests using a commercially available Q-U-V Accelerated Weathering Test. The tests were carried out substantially in accordance with ANSI/ASTM G53-77; UV exposure cycle 8 hours at 70° C., condensation exposure cycle 4 hours at 50° C. The results of the tests are in Table 3. In Tables 2 and 3, A and F are controls. It can be seen from the data in Table 3 that the polymers of Examples 4 and 5 are effective UV stabilizers for the paints.

TABLE 2

| | | Formulation of Paints | | | | | |
|---|---|---|---|---|---|---|---|
| Paint Code | Color | Tinuvin ® 328 | Polymer of Example 4 | Polymer of Example 5 | Catalyst | Blocker | Solvent |
| A | White | — | — | — | .6 | .6 | 23 |
| B | White | — | 6.2 | — | 2 | 2 | 23 |
| C | White | — | — | 3.1 | 2 | 2 | 23 |
| D | White | 2 | 6.2 | — | 2 | 2 | 23 |
| E | White | 2 | — | 3.1 | 2 | 2 | 23 |
| F | Blue | — | — | — | .6 | .6 | 36.1 |
| G | Blue | — | 6.2 | — | 2 | 2 | 36.1 |
| H | Blue | — | — | 3.1 | 2 | 2 | 36.1 |
| I | Blue | 2 | 6.2 | — | 2 | 2 | 36.1 |
| J | Blue | 2 | — | 3.1 | 2 | 2 | 36.1 |

TABLE 3

| | Gloss Loss in QUV Exposure of Paint Panels | | | | | |
|---|---|---|---|---|---|---|
| Paint | | | 20° Gloss | | | |
| Code | QUV HOURS 0 | 285 | 446 | 634 | 871 | 1055 |
| A | 72 | 28 | 14 | 7 | 2 | 1 |
| B | 78 | 58 | 46 | 23 | 8 | 3 |
| C | 83 | 67 | 51 | 24 | 8 | 3 |
| D | 82 | 67 | 51 | 40 | 20 | 8 |
| E | 83 | 82 | 76 | 60 | 37 | 14 |
| F | 50 | 34 | 33 | 25 | 15 | 2 |
| G | 48 | 34 | 29 | 12 | 1 | 0 |
| H | 55 | 42 | 38 | 23 | 5 | 1 |
| I | 51 | 44 | 42 | 32 | 11 | 1 |
| J | 55 | 52 | 51 | 42 | 37 | 19 |

BEST MODE FOR CARRYING OUT THE INVENTION

The best mode for carrying out the invention is presently contemplated as being demonstrated by Example 5.

INDUSTRIAL APPLICABILITY

This invention provides a means for imparting light stability to polymers produced by anionic polymerization techniques, a particularly desirable feature of polymers exposed to weathering conditions, such as in coatings, for example, in paints and finishes.

Athough the preferred embodiments of the invention have been illustrated and described, it is to be understood that there is no intent to limit the invention to the precise constructions herein disclosed, and the right is reserved to all changes and modifications coming within the scope of the invention as defined in the appended claims.

I claim:

1. In an anionic polymerization process for polymerizing at least one anionically polymerizable monomer selected from the group consisting of alkyl methacrylates, fluoroalkyl methacrylates, alkoxyalkyl methacrylates, dialkylaminoalkyl methacrylates and alkadienyl methacrylates, the improvement consisting of using the initiator of the formula

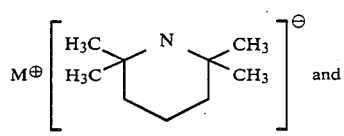

and

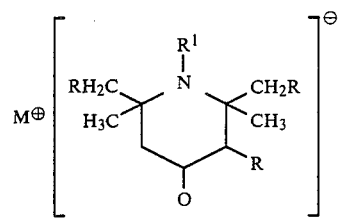

wherein R is H or $C_{1-4}$ alkyl, R' is H, $C_{1-18}$ alkyl or $C_{7-12}$ aralkyl, and M is alkali metal to produce a polymer having good light stability.

2. Process of claim 1 wherein each anionically polymerizable monomer is a methacrylate.

3. Process of claim 2 wherein the methacrylate is methyl methacrylate.

4. Process of claim 2 wherein the methacrylates comprise methyl methacrylate, butyl methacrylate and 2,4-hexadienyl methacrylate.

* * * * *